United States Patent
Cerchiari et al.

(10) Patent No.: US 6,355,281 B1
(45) Date of Patent: Mar. 12, 2002

(54) MICROGRANULE FOR ANIMAL FEEDING

(75) Inventors: Emilio Cerchiari, Des Moulins (MC); Lauro Arduini, Cavriago (IT)

(73) Assignee: S.A.M. Soda (MC)

( * ) Notice: Subject to any disclaimer, the term of this patent is extended or adjusted under 35 U.S.C. 154(b) by 0 days.

(21) Appl. No.: 09/575,944

(22) Filed: May 23, 2000

(30) Foreign Application Priority Data

May 25, 1999 (IT) .......................................... MI99A1160

(51) Int. Cl.⁷ ........................... A23K 1/175; A23K 1/18
(52) U.S. Cl. ........................................... 426/2; 426/807
(58) Field of Search ..................................... 426/2, 807

(56) References Cited

U.S. PATENT DOCUMENTS

| | | | | |
|---|---|---|---|---|
| 3,962,484 A | * | 6/1976 | Grosso et al. ............... | 426/658 |
| 3,996,351 A | * | 12/1976 | Bauer et al. ................. | 424/153 |
| 4,533,557 A | * | 8/1985 | Maruyama et al. ........... | 426/61 |
| 4,642,317 A | * | 2/1987 | Palmquist et al. .......... | 514/558 |
| 4,670,248 A | * | 6/1987 | Schricker .................... | 424/19 |
| 5,190,775 A | * | 3/1993 | Klose ............................ | 426/2 |
| 5,807,594 A | * | 9/1998 | King et al. .................... | 426/2 |

FOREIGN PATENT DOCUMENTS

| | | | |
|---|---|---|---|
| EP | 347329 | * | 12/1989 |
| EP | 0779036 | * | 6/1997 |
| JP | 02163043 | * | 6/1990 |

* cited by examiner

*Primary Examiner*—Chhaya D. Sayala

(57) ABSTRACT

A microgranule for animal feeding, particularly suitable for adding calcium salts to fodders, comprising a calcium salt, which is encapsulated in a protective matrix, comprising at least one higher fatty acid which is either in free form or esterified with glycerol. The microgranule allows to feed the animal with a calcium chloride salt in a substantially moisture-free and highly palatable form.

14 Claims, No Drawings

MICROGRANULE FOR ANIMAL FEEDING

CROSS-REFERENCE TO RELATED APPLICATIONS

This application claims priority to Italian Application Serial No. M199A001160 filed May 25, 1999, the disclosure of which is incorporated herein by reference.

BACKGROUND OF THE INVENTION

The present invention relates to a microgranule for animal feeding, adapted for adding calcium salts to fodders.

In particular, the present invention relates to a calcium salt supplement in microgranule form which can be easily added to conventional animal fodders.

Commonly commercially available fodders for feeding animals have balanced formulae, in which nutrients are associated with inorganic compounds, such as minerals, oligoelements and saline compounds.

Currently, the presence of inorganic saline components in fodders is considered very important in order to provide a formula for animal feeding which is balanced and complete in all the components that are essential for body health and development.

It has in fact been noted that the lack of one or more mineral salts which are physiologically present in the animal body can cause metabolic disorders and compromise or slow the growth of the animal.

It is also known that minerals are involved in a considerable number of biochemical reactions, ranging from the enzyme and hormone activity regulation to the oxidation-reduction reactions, and to the stabilization of balances in acid-base hematic ratios.

In particular it has been noted that in certain stages of the production cycle or of the body growth of the animal there is a higher demand for minerals and oligoelements in order to maintain the homeostatic balance and the anion/cation hematic ratio within physiological ranges.

By way of example, the following situations are noted:
the laying hen during shell production;
milk-producing cattle and sows about to give birth, in order to allow good contraction of smooth muscles in order to avoid hypocalcemia;
pigs and chickens during growth.

In particular, there are certain minerals, such as calcium, sulfur, magnesium and sodium which, in salified form as carbonates, sulfates or chlorides, have a fundamental role, both from the plastic point of view, owing to their ability to fix to the bones of the skeleton and to the teeth, and from the homeostatic point of view, owing to their ability to regulate the acid-base balance of the blood.

It is well-known that lack of one or more of these elements can lead to physical disorders, including milk fever, mastitis, cystitis, formation of kidney stones, digestion disorders and hypocalcemia.

It is well-known that considerable importance is given to the administration of the calcium ion in the most recent intensive and semi-intensive animal rearing techniques. The most recent formulae of animal fodders in fact include variable quantities in terms of calcium salts, generally in the form of calcium chloride.

The importance of the presence of this macroelement in a proper diet has been accepted so favorably by the scientific community that currently applicable statutory provisions on animal nutrition mandate its presence in formulae for animal feeding.

However, it has been noted that the addition of calcium chloride to animal fodders leads to drawbacks in use, including poor stability thereof due to humidity and the introduction of a string bitter taste in the formula, which makes the fodder scarcely palatable for animals.

It has also been noted that the high hygroscopicity of calcium chloride can trigger fermentation processes within the fodder, with a consequent deterioration of the fodder from the nutritional point of view. Moreover, the presence of moisture in the calcium chloride often compromises the operations for mixing the various components of fodders.

Moreover, it has been noted that adding calcium chloride to ordinary fodders leads to a reduction in the amount of fodder ingested per day. This fact has been assessed very negatively by experts in the field because it causes not only the onset of possible metabolic deficiencies but also a general reduction in body mass and a slower growth of the farm animal.

In an attempt to avoid these drawbacks, fodder producers have endeavored to produce alternative saline supplements, but such supplements have been found to be unsuitable for ensuring that the daily requirement of $Ca^{++}$ ions is met.

Moreover, it has been noted that a shortage of calcium ions in the diet can cause a deficit in the operation of the immune system of such an extent so as to expose the animal to microbial or viral infections.

It has also been verified that the addition of calcium salts, as calcium carbonate to fodders, in certain periods of rearing, such as during the weaning of piglets, can even be a negative factor due to the excessive buffer activity of the salt which alters the acid-base blood balance.

Preparations based on calcium chloride in emulsion or gel form, adapted for forced oral administration to the individual animal and only for short periods, are currently commercially available. However, such preparations are not used in the production of fodders because they are not recommended for wide-scale use in farms.

SUMMARY OF THE INVENTION

The aim of the present invention is to avoid, or substantially lessen, the drawbacks noted in the use of calcium salts, with particular reference to calcium chloride, in animal feeding.

An object of the present invention is to provide a microgranule for animal feeding, particularly suitable for adding calcium chloride to fodders, whose taste is acceptable for animals and which can be mixed with the conventional fodders.

Another object of the present invention is to provide a microgranule for animal feeding, which includes a calcium salt with reduced hygroscopicity and can be easily added to formulae for feeding animals.

Another object of the invention is to provide a granular additive based on calcium chloride whose shape and dimensions are such that it can be used in industrial fodder production lines.

These and other objects which will become better apparent hereinafter are achieved, according to a first aspect of the present invention, by a microgranule for animal feeding, particularly suitable for adding calcium salts to fodders, characterized in that it comprises a calcium salt which is encapsulated in a protective matrix comprising a fatty acid, which is either in free form or esterified with glycerol.

DETAILED DESCRIPTION OF THE PREFERRED EMBODIMENTS

According to a preferred embodiment of the present invention, said calcium salt is constituted by calcium chloride.

Within the scope of the present invention, the term "high fatty acid" designates a fatty acid whose number of carbon atoms is higher than 6, and which, preferably, has a carbon atom content within the range between $C_8$ and $C_{18}$.

By way of example, it is possible to use saturated fatty acids such as caprilic, lauric, myristic and palmitic acids, either alone or in a mixture, or even in association with small quantities of unsaturated fatty acids such as for example oleic acid and linoleic acid. These acids can be esterified with glycerol, so as to constitute glycerides or glyceryl trialkanoates, such as for example glyceryl tristearate. The fatty acids used are generally in solid form at room temperature.

Conveniently, a mixture of fatty acids is used which produces a melting point of the protective matrix in the range between 30 and 80° C.

These fatty acids form a protective matrix or film around the saline crystal core which is preferably constituted by 0–30% by weight of a mixture of $C_8$ to $C_{14}$ fatty acids and by 70–100% by weight of $C_6$ to $C_{18}$ fatty acids.

In the microgranule according to the invention, the components are distributed on two layers: an internal one, constituted by the crystalline component (calcium chloride), and an external one, constituted by the protective film or matrix of fatty acid, either free or esterified with glycerol.

The protective matrix forms a waterproof film which prevents the absorption by the calcium salt of the water that is present in the atmosphere or in the surrounding environment. This characteristic is decisive during production of fodder and when feeding the animal.

The application of the protective matrix to the crystalline salt allows effective insulation from any water that is present in the surrounding environment, maintaining the properties of the encapsulated salt. A reduction in the natural hygroscopicity of calcium salts, particularly of calcium chloride, is thus achieved which allows its easier use in techniques for preparing animal fodders and better palatability.

The dimensions of the microgranule according to the invention vary according to its use. Conveniently, its final particle size is in the range of 50 to 10,000$\mu$.

It has also been observed that in order to perform an effective moisture protection function the protective matrix must advantageously constitute a film which uninterruptedly coats the surface of the crystalline compound.

Advantageously, the protective matrix constitutes 2–70% by weight, with respect to the total weight of the microgranule according to the invention.

It has been experimentally observed that the presence of the protective matrix described above allows to considerably limit the absorption of moisture by the crystalline calcium salt encapsulated therein. In particular, moisture values between 2 and 20% have been found even after direct contact with water.

The microgranule according to the present invention is produced by way of a process which preferably employs three treatment steps.

The first step entails mixing a powder constituted by a fatty acid or mixture of fatty acids, either in free form or esterified with glycerol, with a compound of calcium in saline form, generally calcium chloride, in the dry state, inside a mixer.

In a subsequent step, which conveniently occurs in a second mixer provided with a heating and cooling system, the mixture of fatty acids is liquefied and subjected to agitation so as to form a substantially uniform fluid mass.

The process for coating the granule with a film begins in these conditions; at the end of said process, a uniform film constituted by the fatty acids introduced in the mixer has deposited on the outer surface of the granule of salt (calcium chloride). When a substantially uniform layer has been formed, sudden cooling is performed, causing the film to solidify and firmly adhere to the dry crystalline salt.

The produced microgranule is advantageously left to rest for approximately 24–48 hours and then packaged in adapted bags.

According to another aspect of the present invention, a fodder for feeding animals is provided which comprises a microgranule of the above described type.

According to another aspect, the present invention relates to a method in which a $C_8$–$C_{18}$ higher fatty acid or of mixtures of $C_8$–$C_{18}$ fatty acids, in free form or esterified with glycerol are used to form a protective matrix for a calcium salt, said calcium salt being preferably constituted by calcium chloride in a substantially anhydrous form.

According to a preferred embodiment of this last aspect of the invention, said protective matrix comprises a mixture of 0 to 30% by weight of $C_8$ to $C_{14}$ fatty acids and of 70 to 100% by weight of $C_6$ to $C_{18}$ fatty acids, in free form or esterified with glycerol.

EXAMPLES

The following examples are provided merely as illustration of the present invention and must not be construed as limiting the scope of the invention as defined in the appended claims.

Example 1

Microgranule for feeding animals, constituted by:

| | | |
|---|---|---|
| Central body: | $CaCl_2$ | |
| External matrix: mixture of fatty acids | $C_{12}$ | 25% |
| | $C_{16}$ | 50% |
| | $C_{18}$ | 25% |
| Melting point of the mixture: | 62° C. | |
| Particle size of microgranule: | 950$\mu$ | |
| Measured relative humidity of $CaCl_2$ | 4% | |

Example 2

A process for producing, in three steps, a microgranule for feeding monogastric animals.

Step 1

In a standard stainless steel mixer, 870 g of granular calcium chloride with an average particle size of 600 microns is mixed with 130 g of a mixture of powdered fatty acids.

The proportions of the various acidic components of the fats of the matrix are as follows:

$C_{16}$=45%
$C_{18}$=47%
$C_{14}$=5%
$C_8$/$C_{12}$=3%

Step 2

The product of the preceding step 1 is then transferred to another mixer provided with a heating and cooling system. Inside the mixer, the product is kept under agitation by special structures and is gradually heated. As the temperature rises, the fats (fatty acids+glycerol) begin to melt, according to their melting point, causing the film coating of the calcium chloride granule to begin.

At the end of the film coating treatment, the calcium salt is encapsulated in a matrix, or film, constituted by the mixture of said fatty acids so as to form a microgranule which is impermeable to water.

The resulting microgranule has a central body constituted by a calcium chloride granule and by a coating constituted by a mixture of the various fatty acids.

The diameter of the microgranule is between 600 and 1200 $\mu$.

Step 3

The microgranules produced in step 2 are allowed to mature in ventilated containers for a period of preferably 24 to 48 hours and then packaged in bags in compliance with applicable EU standards.

The disclosures in Italian Patent Application No. M199A001160 from which this application claims priority are incorporated herein by reference.

What is claimed is:

1. A microgranule for animal feeding, adapted for adding calcium salts to fodders, consisting of, a crystalline calcium salt encapsulated in a protective matrix, the matrix having one or more fatty acids either in free form or esterified with glycerol and the microgranule having a particle size from 50 to 10,000 micrometers.

2. The microgranule for animal feeding of claim 1, wherein said fatty acid has a carbon atom content of $C_8$ to $C_{18}$.

3. The microgranule for animal feeding of claim 1, wherein said protective matrix comprises 0 to 30% by weight of $C_8$ to $C_{14}$ fatty acids, and 70 to 100% by weight of $C_6$ to $C_{18}$ fatty acids.

4. The microgranule for animal feeding of claim 3, wherein the melting point of said protective matrix is between 30 and 80° C.

5. The microgranule for animal feeding of claim 1, wherein the encapsulated salt is calcium chloride.

6. The microgranule for animal feeding of claim 5, wherein said calcium salt has a humidity of 2 to 20% by weight.

7. The microgranule for animal feeding of claim 6, wherein said protective matrix is present in an amount between 2 and 70% by weight.

8. A fodder for animal feeding, comprising a microgranule as set forth in claim 7.

9. A method for producing a protective matrix for a calcium salt having a particle size from 50 to 10,000 micrometers, wherein the protective matrix uses a material selected from the group consisting of a $C_6$–$C_{18}$ fatty acid and mixtures of $C_8$–$C_{18}$ fatty acids either in free form or esterified with glycerol.

10. The method of claim 9, wherein said calcium salt is calcium chloride.

11. The method of claim 9, wherein said matrix comprises a mixture of 0 to 30% by weight of $C_8$–$C_{14}$ fatty acids and of 70 to 100% by weight of $C_6$–$C_{18}$ fatty acids.

12. The method of claim 9, wherein the fatty acid is used in an amount between 2 and 70% by weight with respect to the weight of the finished product, constituted by a calcium salt encapsulated in a protective matrix.

13. A method for animal feeding, comprising adding to a fodder a calcium salt supplement in the form of a microgranule made in accordance with claim 1.

14. A microgranule for animal feeding, adapted for adding calcium salts to fodders, consisting essentially of, a crystalline calcium salt encapsulated in a protective matrix, the matrix having one or more fatty acids either in free form or esterified with glycerol and the microgranule having a particle size from 50 to 10,000 micrometers.

* * * * *